(12) United States Patent
Maughan

(10) Patent No.: US 12,439,889 B2
(45) Date of Patent: Oct. 14, 2025

(54) METHODS OF USING TRAINING AID DELIVERY DEVICES (TADD)

(71) Applicant: SCIK9 LLC, Lorton, VA (US)

(72) Inventor: Michele Nancy Maughan, Bear, DE (US)

(73) Assignee: SCIK9 LLC, Lorton, VA (US)

( * ) Notice: Subject to any disclaimer, the term of this patent is extended or adjusted under 35 U.S.C. 154(b) by 333 days.

(21) Appl. No.: 16/934,713

(22) Filed: Jul. 21, 2020

(65) Prior Publication Data

US 2020/0344978 A1 Nov. 5, 2020

Related U.S. Application Data

(63) Continuation of application No. 15/449,971, filed on Mar. 5, 2017, now Pat. No. 10,813,342.

(60) Provisional application No. 62/334,328, filed on May 10, 2016.

(51) Int. Cl.
*A01K 15/02* (2006.01)

(52) U.S. Cl.
CPC .................................. *A01K 15/02* (2013.01)

(58) Field of Classification Search
CPC .. A01G 15/02; A01G 5/0114; B65D 51/1616; B65D 81/263; B65D 85/52; B65D 51/1605; B65D 51/1611
See application file for complete search history.

(56) References Cited

U.S. PATENT DOCUMENTS

| | | | |
|---|---|---|---|
| 3,471,051 A | 10/1969 | Cistone | |
| 4,534,483 A | 8/1985 | Kassis et al. | |
| 4,693,399 A * | 9/1987 | Hickman | B65D 47/0847 220/826 |
| 4,839,292 A | 6/1989 | Cremonese | |
| 4,851,351 A | 7/1989 | Akamine | |
| 5,047,347 A | 9/1991 | Cline | |
| 5,054,234 A * | 10/1991 | Cassells | B65D 81/263 47/84 |
| 5,523,236 A | 6/1996 | Nuzzo | |
| 5,727,707 A * | 3/1998 | Wickland | B65D 85/82 220/641 |
| 5,730,306 A | 3/1998 | Costa et al. | |
| 5,911,332 A * | 6/1999 | Wickland | G21F 5/06 220/303 |
| 6,425,350 B2 | 7/2002 | Bulanda | |
| 6,619,499 B1 | 9/2003 | Lin | |
| 6,780,638 B2 | 8/2004 | Powell | |
| 6,843,158 B2 | 1/2005 | Garcia et al. | |

(Continued)

FOREIGN PATENT DOCUMENTS

WO WO-2014181118 A1 * 11/2014 ............. A01K 15/02

OTHER PUBLICATIONS

Definition of the term "Membrane", Oxford English Dictionary On Line.

(Continued)

*Primary Examiner* — Kristen C Hayes
(74) *Attorney, Agent, or Firm* — Panitch Schwarze Belisario & Nadel LLP

(57) ABSTRACT

Training aid delivery devices (TADDs) enabling the containment of training aid substances while allowing odor, in the form of volatile organic compounds (VOCs), to emanate freely out of the device have been developed. The use of one or more TADD in canine training are described.

8 Claims, 3 Drawing Sheets

(56) References Cited

U.S. PATENT DOCUMENTS

| | | | |
|---|---|---|---|
| 7,078,228 B2 | 7/2006 | Lacey et al. | |
| 7,134,575 B2 | 11/2006 | Vogel et al. | |
| 7,146,934 B1 | 12/2006 | Staley | |
| 7,419,819 B2 | 9/2008 | Nishimoto et al. | |
| 7,461,754 B2 | 12/2008 | Walsh | |
| 7,754,478 B2 | 7/2010 | Suzuki et al. | |
| 8,029,204 B2 | 10/2011 | deVirag et al. | |
| 8,057,118 B2 | 11/2011 | Yuhas | |
| 8,177,082 B2 | 5/2012 | Cattadoris et al. | |
| 8,220,649 B2 | 7/2012 | Walsh | |
| 8,697,443 B2 | 4/2014 | Wilson et al. | |
| 8,701,941 B2 | 4/2014 | Fuller et al. | |
| 9,545,081 B2 | 1/2017 | Nolan | |
| 9,708,110 B2 | 7/2017 | Walsh | |
| 9,834,331 B2* | 12/2017 | Bruna | B23K 26/361 |
| 10,947,021 B2* | 3/2021 | Steed | A01K 15/02 |
| 2001/0047771 A1* | 12/2001 | Bulanda | A01K 15/02 |
| | | | 119/712 |
| 2003/0056653 A1* | 3/2003 | Ueki | G11B 33/146 |
| 2003/0126977 A1 | 7/2003 | Garcia et al. | |
| 2004/0173645 A1 | 9/2004 | Vogel et al. | |
| 2007/0177929 A1* | 8/2007 | Yuhas | A45D 34/04 |
| | | | 401/262 |
| 2012/0067290 A1 | 3/2012 | Mainini | |
| 2013/0134186 A1* | 5/2013 | Defemme | B65D 51/1616 |
| | | | 222/321.1 |
| 2014/0048017 A1 | 2/2014 | Mainini et al. | |
| 2014/0261211 A1 | 9/2014 | Tuan et al. | |
| 2015/0114301 A1 | 4/2015 | Nolan | |
| 2015/0231673 A1* | 8/2015 | Dallas | B65D 51/18 |
| | | | 206/223 |
| 2018/0027771 A1 | 2/2018 | Wachter et al. | |
| 2018/0222644 A1* | 8/2018 | Fisch | B65D 51/1616 |

OTHER PUBLICATIONS

Definition of the term "Impermeable", Oxford English Dictionary On Line.

Definition of the term "Prevent", Oxford English Dictionary On Line.

Definition of the term "Porous", Oxford English Dictionary On Line.

Lazarjani et al., "Processing and extraction methods of medicinal cannabis: a narrative review," Journal of Cannabis Research, vol. 3, No. 32, pp. 1-15 (2021).

Reygner et al., "Freeze-dried fecal samples are biologically active after long-lasting storage and suited to fecal microbiota transplantation in a preclinical murine model of Clostridioides difficile infection," Gut Microbes, vol. 11, No. 5, pp. 1405-1422 (2020).

* cited by examiner

METHODS OF USING TRAINING AID DELIVERY DEVICES (TADD)

BACKGROUND OF THE INVENTION

There are several types of vessels used in laboratories for size scale-ups or cell culturing systems. These vessels are stationary flasks and roller bottles. The vessels are charged with growth media, seeded with cells, and then placed in incubation chambers with suitable environments for the particular cells being grown. These vessels must vent gas emitted by the cultured cells growing inside and equilibrate with a chamber's atmosphere. The need to allow equilibration between the vessel and the chamber is addressed in several ways. Since many vessels have necks with screw caps, one simple solution is to leave the caps ajar, which allows the gas interchange. While this technique allows gas interchange, it may also allow microbial contamination of the culture system.

The need for gas exchange between culture vessels and incubation chamber atmosphere was recognized in U.S. Pat. No. 5,047,347 which discloses a gas impermeable culture flask with provisions for gas permeation. The disclosure includes a cap for a vessel including a gas permeable insert and a hinged cover to close the gas permeable insert. The disclosure also includes a culture vessel with a sidewall port having a gas permeable insert having a cover. Vessels incorporating the teachings of U.S. Pat. No. 5,047,347 with a side port are complex to manufacture and thus are not widely used. A closure described in U.S. Pat. No. 5,523,236 describes a closure system including provisions for venting, closure, and one handed operation, minimizing the disruption to the growing cells.

All would agree canine training is a different scientific field than cell culturing. Specifically, canine trainers work with a select group of dogs to teach them the ins-and-outs of explosive detection, for example. These dogs have a remarkable ability to sniff out over 19,000 explosive scents and therefore they are ideal for this job. Dogs chosen for such training are hand selected based on breed; physical/medical soundness; motivation for food or a toy reward; suitability for working in a specific environment; and strength of temperament. A breed chosen by many are Labradors, because of their intelligence and most importantly their unwavering good temperament. Once a dog has been selected as a potential scent detection dog, the dog is typically enrolled in a formal education and training program including "imprinting" to teach the dog to recognize and alert to explosives. Dogs that graduate from training are then matched with a handler, forming a dog team. The dog and handler typically undergo an additional 10-20 weeks of intense one-on-one training, learning to work together as a team to find explosives in operational settings and locations such as cars, trucks, and luggage. Once they pass the final test, called Certification, the teams are deployed to sites throughout the world working as the first line of defense against explosive threats to personnel and buildings.

During the training of explosive detection dogs, the dogs are introduced to "distractors" or materials (scents) trainers want the dogs to ignore. Distractors are typically those materials (scents) dogs come into contact with on a daily basis or during the course of their work. During training, these animals may be exposed to hundreds of different distractors, including things like dish soap, baking soda, cheese-doodles, and even dog food until they learn to ignore these scents.

There are many types of detection trainings for animals. For example, an accelerant detection canine (ADC) is trained to sniff out minute traces of ignitable liquid accelerants used to start a fire. Each accelerant detection canine is typically made part of a team that consists of a canine and a handler. The handler is typically a law enforcement officer who has been trained to investigate fire scenes.

Scent detection canines are trained to detect various odors using "training aid substances" (TASs) which are typically the actual material the canine should learn to detect such as heroin or marijuana. Often times it is possible to handle training aids without any special containment by simply holding it in your bare hands. However, certain TASs require specialized containment systems, such as nitromethane liquid explosive, or highly refined cocaine powder. Other hazardous materials used for imprinting dogs include: toxic chemicals; microorganisms; human bodily fluids/gases corresponding to diabetes, seizures, and cancers; and even endangered or invasive species scat. It is important for an animal to smell a scent without injury.

The conventional devices that hold TASs are cotton scent bags (FIG. 1) and metal scent tins (FIG. 2). These containment systems are limited in their ability to contain hazardous materials because liquids and powders may escape from the openings of a metal scent tin and powders may escape from the weaved fibers of the cotton scent bag, or out of the holes of the metal scent tin. A canine training aid delivery device must be developed to safely contain hazardous materials while allowing volatile organic compounds (VOCs), or odors, to emanate freely out of the delivery device so animals undergoing training and/or imprinting may smell a scent without a risk of injury.

SUMMARY OF THE INVENTION

New training aid delivery devices (TADDs) and their methods of use have been discovered enabling the safe containment of hazardous materials and the safe presentation of scents to animals, preferably canines, for training and imprinting. The devices and methods of the present invention are a major advance in the field of animal training greatly expanding the type and integrity of substances used during animal imprinting.

One embodiment of the present invention is a training aid delivery device comprising: a cap; a membrane permeable to volatile organic compounds of a TAS, but impermeable to the TAS; and a hand held container having a base, an opening, and an interior. Preferably the membrane and the cap is attached to the opening of the container and it is also preferred that the cap, membrane, and the hand held container are made of low outgassing materials. There are many TADD designs including a TADD having a membrane attached to a cap. A TADD cap is preferably a flip-top or screw-top having more than one hole. A TADD was designed to contain TASs that are toxic without spillage but allow the release of one or more safe volatile organic compounds into the environment. It is preferred that a TADD interior has the ability to be cleaned and sterilized as to provide a clean container for the TAS to ensure that animals are trained to recognize the odor of the TAS and not extraneous or adventitious odors.

Another embodiment of the present invention is a TADD comprising: a cap; a membrane permeable to a volatile organic compound derived from a TAS but impermeable to the TAS; and a hand held container having a base, an opening, and an interior whereby the membrane and the cap may attach to the opening of the container.

Another embodiment of the present invention is a method of training an animal comprising the following steps: providing a TADD of the present invention; placing a TAS into a TADD container; attaching a membrane and cap to the opening of a TADD container to create an activated TADD; and providing an activated TADD to an animal so the animal smells the TAS. The last step of this method may be repeated until the animal imprints the scent of the TAS. Examples of training aid substances include a piece of cadaver, a drug, an explosive material, a chemical, a biological material such as a microbe or fungus, a piece of clothing, an insect, and an accelerant.

Another embodiment of the present invention is a kit for canine training comprising: at least one TADD of the present invention substantially free of a training aid substance (serving as a blank in which to extinguish the canine's response to the containment system and ensure odor recognition on just the TAS) and at least one TADD of the present invention comprising a training aid substance. The training aid kit may also contain relevant distractor and TADDs containing distractors.

The term "toxic" means poisonous, infectious, or harmful to the health of a subject. A subject may be a human or animal.

DETAILED DESCRIPTION OF THE INVENTION

TADD Design

Figure 3A:
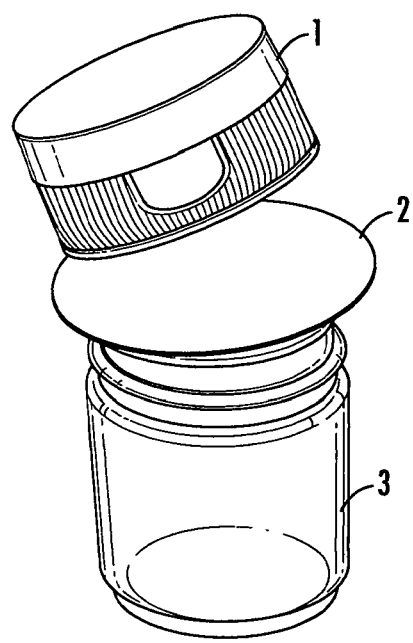
FIG. 3A to 3C illustrates examples of TADD designs of the present invention including different cap designs.
Figure 3B:
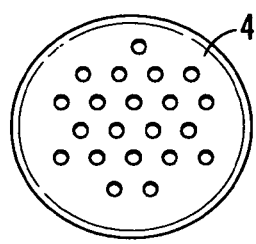
Figure 3C:
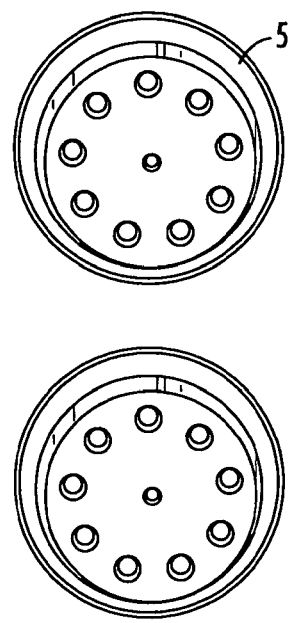

The present invention includes a device, called a Training Aid Delivery Device, or TADD, having at least three distinct elements: a container, a gas permeable membrane, and a cap. FIG. 3 provides an example of a TADD including a flip cap (1), a removable, or detachable, membrane (2), and a glass container in a cylinder shape having a flat base and a wide mouth to which a membrane may be attached by screwing the flip cap (1) to the mouth of the glass container (3). FIGS. 3B and 3C illustrate other embodiments of caps that are twist caps having holes. TADDs are preferably closed systems that allow gas permeation (release of VOCs) through the membrane and cap (when the cap is open) but prevent the release of training aid substances.

Figure 4D:
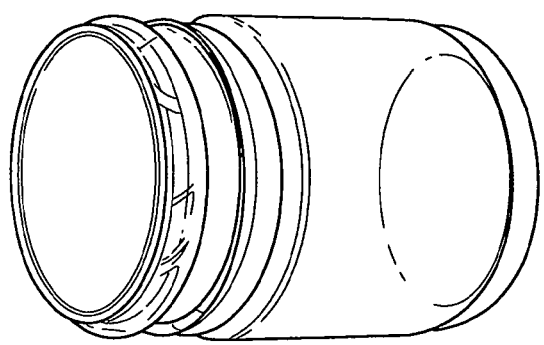
FIG. 4A to 4D illustrates one method of TADD assembly wherein the membrane is removable.
Figure 4C:
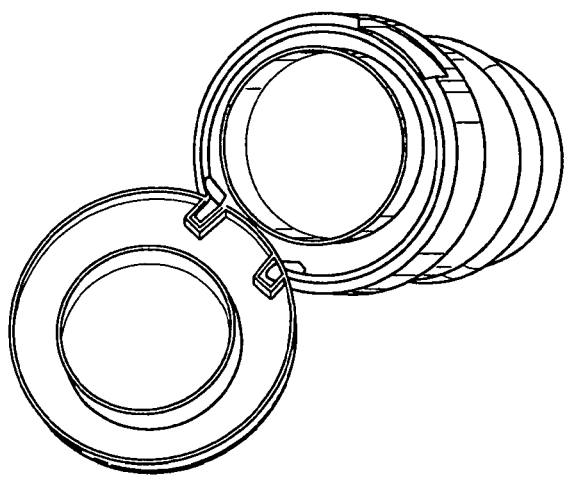
Figure 4B:
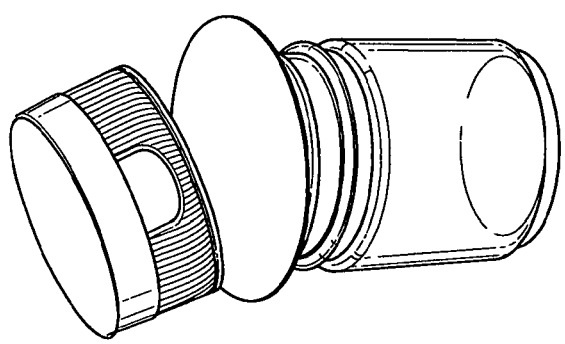
Figure 4A:
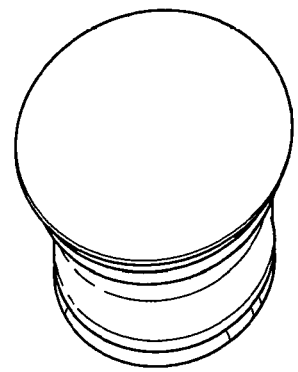

FIGS. 4A to 4D illustrate one method of TADD assembly having a removable membrane and a flip top cap or closure. A membrane is placed over the TADD opening and a flip top cap is placed over the membrane so that the membrane is located between the TADD container opening and the flip top cap. The flip top cap is then attached to the TADD container by screwing the top over the threads on the outside of the TADD opening. In the process of attaching the cap to the TADD opening, the membrane is secured between the cap and the container as shown in FIGS. 4B to 4D. A TADD may be paced in a secondary containment system such as a Mylar bag and/or water-tight plastic container, for example. In addition, during training or imprinting exercises, the TADDs may be placed in a variety of training environments such as scent boxes, operational hides, etc., chosen by a handler, or trainer, for imprinting or training.

TADD Container

The container is preferably made of glass, but can also be made of plastic, stainless steel, or other materials depending on the animal training application and the desired compatibility between the container material and the TAS. Container materials may also be chosen based on where the TADD will be used. For example, TADDs used in harsh environmental conditions may be made of ruggedized thick glass that can be dropped from 6' on concrete and survive the fall. For light sensitive TASs, amber glass TADD containers can be used to protect the TAS from photodegradation.

The materials selected for the container are preferably easy to clean allowing the quick removal of unwanted scents during training or imprinting. The container may have many different shapes, such as a flask, bulb, or circular shape but it is preferred that the container is small enough to fit into one's hand and have a flat bottom so that the container may rest without falling over. The preferred container shape is a cylinder having a flat bottom and a wide mouth enabling the release of volatile organic compounds, or VOCs, that produce a scent detected by canines, or other animals. In most circumstances, the container must be large enough to hold a training aid substance needed to train, or imprint. Depending upon the specialized training, the training aid substance may be a piece of a cadaver, a drug, an explosive, a biochemical, an accelerant, a chemical, insects, a piece of clothing, a sample from an endanger species, or scents such as birch, clove, or aniseed. The TASs may be dry, wet, or of some consistency in between and they may be toxic, hazardous, or safe to inhale without the use of the membrane. The membrane may be used to keep biohazard, or toxic compounds contained in the container while allowing safe VOCs, or scents derived from such TASs, to permeate the membrane and be released outside the TADD. These safe, non-toxic scents are then smelled by the animal being trained or imprinted. The membrane also is a barrier that keeps training aid substances inside the TADD container so that toxic training aid substances, such as an infectious microorganisms or a strong acids, are prevented from coming in contact with a handler, or an animal, by spillage causing injury. Specific examples of training aid substances include: liquids such as urine, liquid methamphetamine, nitromethane, difficult solvents, acids, bases, and alcohols; and powders such as drugs (e.g. cocaine), or explosive powders, for example.

TADD Membrane

The gas permeable membrane portion of a TADD may be secured to a container, to a cap, or is removable as shown in FIG. 4. If the membrane is secured to a cap, the cap must be designed to have one or more holes to allow the VOCs present inside a container to permeate the membrane (but not the TAS) and be released through one or more hole in the cap to the outside of a TADD. An example of such a cap is shown in FIGS. 3B and 3C. The membrane is selected to hold a liquid, or a dry TAS, that may be hazardous, within a TADD container. A hazardous TAS such as an infectious microorganism may produce one or more safe VOCs on the inside of a TADD container that can be released into the environment, through the gas permeable membrane and open cap, for animal imprinting and training. The animal is able to smell the safe VOCs, or scents, without touching the hazardous material (such as a microorganism). The membrane is preferably made of a polymer that is porous having one or more pore sizes in the range large enough to allow VOCs to escape the TADD but small enough to prevent a training aid substance from escaping the interior of a TADD. A preferred membrane material is polytetrafluoroethylene (PTFE) with 0.2 micron pores. While PTFE is compatible with most training aid substances, the membrane could consist of type 316 stainless steel, polyethersulfone (PES), polypropylene (PP), polycarbonate track etch (PCTE), or polyester (PETE). It is also preferred that the membrane is hydrophobic to avoid liquid training aid substances from permeating the membrane.

One embodiment of the present invention is a TADD having a removable membrane. Such a TADD can be filled with liquid, powder, or solid material in a range of volumes. Once the training aid substance is in the TADD container, the membrane is gently placed on the top of the TADD container and then the plastic cap is screwed on securing the membrane between the cap and the TADD container.

Another embodiment of the present invention is that the TADD has an attached, or not easily removed, membrane that is part of the cap, the container, or both. The attached membrane is not easily removed from the cap, or from the container, that it is attached to.

TADD Cap

A TADD cap may have different shapes and design features based on training/imprinting applications or environmental conditions. The cap (1) may be made of stainless steel, polypropylene plastic, or other types of plastic, depending on the level or durability needed for the end-use. The cap may be designed to have different size openings depending on the desired and relative amount of odor the end-user would like released. The cap can be fitted with a sifter insert, or a talcum powder type design that can be turned from side to side to open and close the holes to expose the odor as shown in FIGS. 3B and 3C. Generally, a TADD cap, with or without a removable membrane, must be fastened securely to a TADD container, preferably creating an air tight seal. If an air tight seal is not created, one may provide an additional seal where the cap is secured to a container. For example, paraffin film may be wrapped around the cap/container interface to reduce evaporation of liquid materials.

As mentioned, the cap may not have an attached membrane, so one embodiment of assembling a TADD is to place a filter membrane between the cap and container and securing the cap onto the container forming a seal between the threading of the glass jar and the plastic cap above it. One preferred embodiment of the present invention is to make the container, cap, and membrane out of the same material so that a canine, or animal, recognizes only one other scent (the scent of the TADD) in addition to the scent of the training aid substance that is placed inside the TADD. If a TADD is designed with a cap, membrane, and container made out different materials, then a canine, or animal, must learn to distinguish between the scents of the three different materials from the TAS that is present in the TADD, through a process called extinguishing. It is important that the canine only recognizes and focuses on the scent of the TAS and not focus on the scent of the materials the TADD is made out of.

Another embodiment of the present invention is a flip-top cap design providing a handler/trainer additional advantages. A flip top cap design would allow a handler to remove a TADD out of a secondary containment system using only one hand. The handler may then pop open the hinged lid (with one hand) and set the TADD in whatever training environment he or she desires such as scent boxes or operational hides. When the training or imprinting sessions are completed, the handler/trainer then closes the hinged lid and is able to place the TADD back in a secondary containment system using one hand.

Another embodiment of the present invention is a screw-top cap in which there is a distinct closed, gas-tight, position and a distinct open, gas-permeable position such that one-handed operation and TAS VOC preservation are both possible.

Conventional Containment Devices Used in Canine Training

Figure 1:
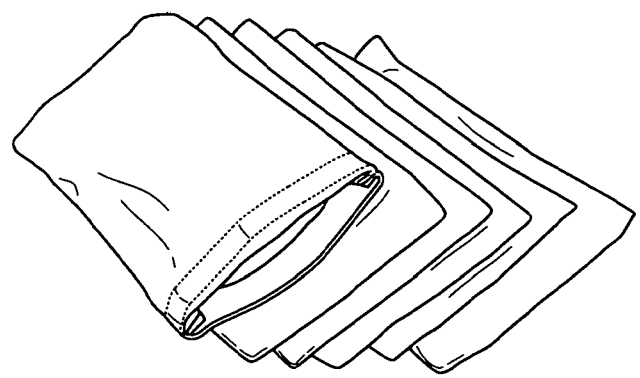
FIG. 1 illustrates conventional cotton scent bags.
Figure 2:
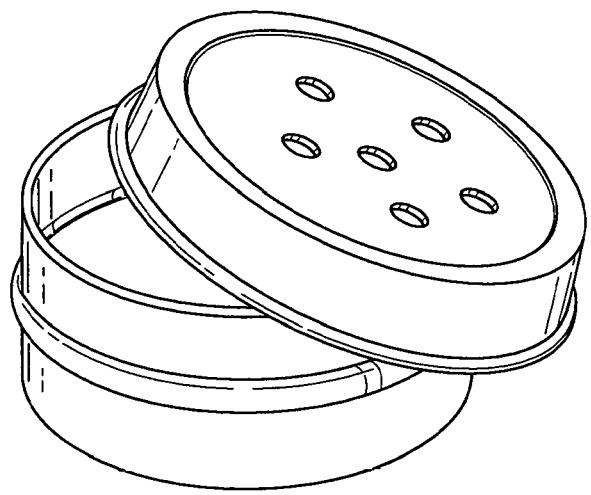
FIG. 2 illustrates conventional metal scent tins.

Conventional devices used during canine training may be observed in FIGS. 1 and 2. FIG. 1 illustrates cotton scent bags that have an opening on one end for the placement of training aid substance into the interior of the bags. The opening of these bags are illustrated in FIG. 1 and they include a zipper, or Velcro, that when closed secures the training aid substance inside the bags. FIG. 2 is an example of a metal scent tin used in canine training and imprinting exercises. These containment systems are limited in their ability to contain various materials such as liquids and powders, which escape from weaved, cotton fibers of the bag or out of the holes of the metal tin.

The advantages of the present invention over existing containment systems include: 1) a TADD is able to contain a wide variety of materials, some that may be hazardous, and allow the delivery of safe, non-toxic, VOCs to an animal; 2) the use of training aid substances in a variety of forms such as liquids, powders, and solids, without leakage and/or spillage; 3) the containment of biological material greater than 0.2 microns in size; 4) the containment of liquid materials due to the hydrophobic nature of the filter membrane; 5) the containment of reactive materials (glass is one of the least reactive surfaces available for a TADD container); and 6) a TADD may be cleaned according to EPA standard methods to remove trace VOCs or can be autoclaved to provide a sterile internal environment. The present invention prevents: 1) human scent contamination of a TAS by having little or no spillage and having an easy to clean surface; 2) loss of TAS due to environmental conditions since the present invention may be made out of rugged materials; and 3) scent cross-contamination because of no spillage of TASs and a TADD is easy to clean so TASs are not left behind on a TADD or on training environments such as in scent boxes or in operational hides.

Training

Training is based on the principles of conditioning wherein behavior is changed (odor recognition) by the use of reinforcement (rewards such as food or play) which is given after the desired response (alert or sit).

The first part of training is imprinting. A canine is initialized by being exposed to a TASs for imprinting, such as an accelerant, contained in a TADD of the present invention, then the canine is taught how to alert, and then the canine receives a reward.

Next, the canine is taught to ignore normal scents such as pyrolysis (burning) products that would be present at most fire scenes (i.e. distractors). Most accelerant detection canines are trained to respond passively to an odor by sitting (alert) until the handler commands "show me," and the canine will point its nose, or pat its paw, where the odor is detected.

Once the canine has been exposed to both TASs for imprinting (ignitable liquids) and distractors (pyrolysis products) within a TADD of the present invention, the canine is taught to discriminate between these two accelerants and to alert to only non-pyrolysis accelerants. Finally, the handler is brought in to work with his or her canine until it's time to prove themselves through verification and certification.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of training an animal, said method comprising:
   (a) providing a training aid delivery device comprising (I) a cap, (II) a gas-permeable membrane, and (III) a container, the container comprising a base, an opening, and an interior cavity,
      wherein the gas-permeable membrane and cap can be attached to the opening of the container to create an enclosed compartment comprising the interior cavity,
      wherein the container is impermeable to a training aid substance and one or more volatile organic compounds that are produced or released by the training aid substance, said training aid substance comprising a powder or liquid,
      wherein the gas-permeable membrane is impermeable to the training aid substance but permeable to the one or more volatile organic compounds that are produced or released by the training aid substance; and
   (b) placing the training aid substance into the interior cavity of the container;
   (c) attaching the gas-permeable membrane and cap to the opening of the container to create an activated training aid device that contains the training aid substance within the interior cavity, wherein the training aid substance cannot escape the device while the one or more volatile organic compounds that are produced or released by the training aid substance can escape the device through the gas-permeable membrane; and
   (d) providing the activated training aid device to an animal and allowing the animal to smell the one or more volatile organic compounds that are produced or released by the training aid substance that permeate or diffuse through the gas-permeable membrane.

2. The method of claim 1, wherein the container is a hand-held container.

3. The method of claim 1, wherein the gas-permeable membrane is hydrophobic.

4. The method of claim 1, wherein the gas-permeable membrane is a polymer selected from the group consisting of polytetrafluoroethylene (PTFE), polyethersulfone (PES), polypropylene (PP), polycarbonate track etch (PCTE), polyester (PETE), and combinations thereof.

5. The method of claim 1, wherein the gas-permeable membrane comprises pores with a diameter of no more than about 0.2 microns.

6. The method of claim 1, wherein the cap comprises stainless steel or plastic.

7. The method of claim 1, wherein the training aid substance is selected from the group consisting of a narcotic, an explosive, a chemical, a biological material, a birch, clove, or aniseed oil, and an accelerant.

8. The method of claim 1, wherein the training aid substance comprises cocaine; liquid methamphetamine; a biohazardous material; a toxic compound; a microorganism; urine; scat from an endangered or invasive species scat; nitromethane; a solvent; an acid, base, or alcohol; an explosive powder; or combinations thereof.

* * * * *